United States Patent
Nakayama et al.

(10) Patent No.: US 12,037,273 B2
(45) Date of Patent: Jul. 16, 2024

(54) ION REMOVAL APPARATUS

(71) Applicant: Mitsubishi Electric Corporation, Tokyo (JP)

(72) Inventors: Yoshihiro Nakayama, Tokyo (JP); Tadashi Saito, Tokyo (JP); Kota Kurihara, Tokyo (JP); Seiji Noda, Tokyo (JP); Ryuki Yoshida, Tokyo (JP); Masaru Takada, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 18/286,395

(22) PCT Filed: Apr. 26, 2021

(86) PCT No.: PCT/JP2021/016570
§ 371 (c)(1),
(2) Date: Oct. 11, 2023

(87) PCT Pub. No.: WO2022/230003
PCT Pub. Date: Nov. 3, 2022

(65) Prior Publication Data
US 2024/0083783 A1    Mar. 14, 2024

(51) Int. Cl.
*C02F 1/469* (2023.01)
(52) U.S. Cl.
CPC .................. *C02F 1/4691* (2013.01)
(58) Field of Classification Search
CPC .......................................... C02F 1/4691–4696
See application file for complete search history.

(56) References Cited

U.S. PATENT DOCUMENTS

| | | | | |
|---|---|---|---|---|
| 4,925,541 | A | * | 5/1990 | Giuffrida .............. B01D 61/48 |
| | | | | 204/524 |
| 2020/0180982 | A1 | * | 6/2020 | Dutta ..................... B01D 61/42 |

FOREIGN PATENT DOCUMENTS

| | | |
|---|---|---|
| CN | 108423776 A | 8/2018 |
| CN | 112320903 A | 2/2021 |
| JP | 2002-336865 A | 11/2002 |
| JP | 2012-086189 A | 5/2012 |

(Continued)

OTHER PUBLICATIONS

International Search Report and Written Opinion mailed on Jun. 22, 2021, received for PCT Application PCT/JP2021/016570, filed on Apr. 26, 2021, 9 pages including English Translation.

(Continued)

*Primary Examiner* — Alexander S Noguerola
(74) *Attorney, Agent, or Firm* — XSENSUS LLP

(57) ABSTRACT

An ion removal apparatus according to this disclosure performs a desalination treatment on a liquid and includes: a first electrode guide having an inlet allowing the liquid to flow in, a first electrode holder holding a first electrode that adsorbs an ion in the liquid, and an inflow passage serving as a flow passage connecting the inlet and the first electrode holder to one another; and a second electrode guide having an outlet allowing the liquid to flow out, a second electrode holder allowing the liquid passing through the first electrode holder to flow in and holding a second electrode that adsorbs the ion in the liquid, and an outflow passage serving as a flow passage connecting the outlet and the second electrode holder to one another.

8 Claims, 2 Drawing Sheets

(56) References Cited

FOREIGN PATENT DOCUMENTS

| JP | 2012-086192 A | 5/2012 |
|---|---|---|
| JP | 2018-158276 A | 10/2018 |

OTHER PUBLICATIONS

Notice of Reasons for Refusal mailed on Dec. 21, 2021, received for JP Application 2021-552912, 6 pages Including English Translation.
Decision of Refusal mailed on Mar. 15, 2022, received for JP Application 2021-552912, 4 pages including English Translation.
Decision to Grant mailed on Aug. 16, 2022, received for JP Application 2021-552912, 5 pages including English Translation.
Office Action issued Mar. 12, 2024 in Chinese Patent Application No. 202180097314.6, 15 pages.

\* cited by examiner

ION REMOVAL APPARATUS

CROSS-REFERENCE TO RELATED APPLICATION

This application is based on PCT filing PCT/JP2021/016570, filed Apr. 26, 2021, the entire contents of which are incorporated herein by reference.

TECHNICAL FIELD

The technology disclosed herein relates to an ion removal apparatus that removes an ionic substance from a liquid such as water. The technology particularly relates to a configuration for performance improvement.

BACKGROUND ART

A Capacitive Deionization Ion (CDI) technology is an electric desalination technology applied with the principle of an electric double layer capacitor. Desalination apparatuses using the CDI technology include a separator having insulation properties and liquid permeability and disposed between a pair of electrodes. In the desalination apparatuses, the pair of electrodes is applied with a voltage to adsorb a charged ionic substance dissolved in a liquid such as water (hereinafter, this substance is referred to simply as an ion), and the desalination apparatuses thereby remove ions from the liquid.

Here, one apparatus of such desalination apparatuses includes, in a housing thereof, a unit in which electrodes are accommodated in electrode holders provided in gaskets, separators are interposed between the pair of gaskets, and a pair of current collecting electrodes made of a conductive material are connected to outer-side portions of the electrodes. The apparatus includes a spacer between the separators. The housing has an inlet and an outlet. The inlet, the spacer, and the outlet form a flow passage through which water flows in this order, and the ions included in the water flowing through the flow passage are removed (for example, refer to Patent Literature 1).

CITATION LIST

Patent Literature

Patent Literature 1: Japanese Unexamined Patent Application Publication No. 2012-086189

SUMMARY OF INVENTION

Technical Problem

However, in such an apparatus disclosed in Patent Literature 1, a portion of the water passing through the flow passage passes through only the spacer between the separators and thus becomes treated water. The treated water does not come into contact with the electrode, thereby not undergoing an ion removal treatment. Thus, a problem of reduction in ion removal performance arises.

Thus, an object of the present disclosure is to provide an ion removal apparatus with which the above-described problem is solved and an ion removal performance can be increased.

Solution to Problem

An ion removal apparatus according to an embodiment of the present disclosure performs a desalination treatment on a liquid and includes: a first electrode guide having an inlet allowing the liquid to flow in, a first electrode holder holding a first electrode that adsorbs an ion in the liquid, and an inflow passage serving as a flow passage connecting the inlet and the first electrode holder to one another; and a second electrode guide having an outlet allowing the liquid to flow out, a second electrode holder allowing the liquid passing through the first electrode holder to flow in and holding a second electrode that adsorbs the ion in the liquid, and an outflow passage serving as a flow passage connecting the outlet and the second electrode holder to one another.

Advantageous Effects of Invention

According to the ion removal apparatus of an embodiment of the present disclosure, the liquid that has flowed in can pass through the first electrode and the second electrode in this order, thereby being able to come into contact with the first electrode and the second electrode. Thus, reduction in ion removal performance can be prevented.

DESCRIPTION OF EMBODIMENTS

Figure 1:
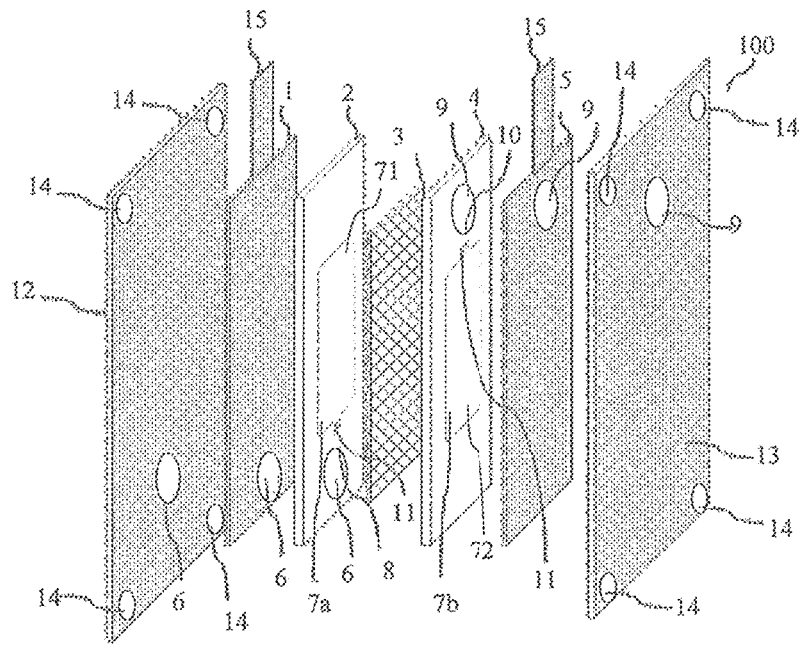
FIG. 1 illustrates the configuration of an ion removal apparatus 100 according to Embodiment 1.

Hereinafter, ion removal apparatuses according to embodiments will be described with reference to, for example, the drawings. In the following drawings, parts denoted by the same reference signs are the same or equivalent to one another, and the same applies throughout the entire description of the embodiments below. In the drawings, the relationship of the sizes of the constituting parts sometimes differs from the relationship of the sizes of the actual constituting parts. The forms of the constituting elements represented in the entire description are merely examples and do not limit the constituting elements to the forms described in the description. All of the devices described in the description are not necessarily included. In particular, the combination of the constituting elements, for example, is not limited to only the combination in each of the embodiments, and a constituting element described in one embodiment can be applied to another embodiment. In the description, hereinafter, "water" that is a liquid to be treated by the apparatus refers to, without distinction, raw water before undergoing an ion removal process, water that has been treated through the ion removal process, and reclamation-time wastewater whose ion concentration has been increased by a treatment of an ion desorption process performed after the ion removal.

Embodiment 1

FIG. 1 illustrates the configuration of an ion removal apparatus 100 according to Embodiment 1. The ion removal apparatus 100 continually removes ions in a liquid through the repetition of two processes: an ion removal process with desalination and an ion desorption process, thereby producing a liquid from which ions have been removed. Herein, a treatment in the ion removal process performed by the ion removal apparatus 100 will mainly be described.

As FIG. 1 illustrates, the ion removal apparatus 100 according to Embodiment 1 includes a first current collector 1, a first electrode guide 2, a separator 3, a second electrode guide 4, a second current collector 5, a first pressing plate 12, and a second pressing plate 13. In the ion removal apparatus 100, the ions dissolved in water are removed by being adsorbed onto a first electrode 71 held by a first electrode holder 7a of the first electrode guide 2 and onto a second electrode 72 held by a second electrode holder 7b of the second electrode guide 4. The first electrode 71 and the second electrode 72 will be described later.

The first current collector 1 has an inlet 6 through which the water to be treated flows in and a terminal 15. In the ion removal process performed by the ion removal apparatus 100, the first current collector 1 feeds electricity to supply electric charges to the first electrode 71 disposed in the first electrode holder 7a of the first electrode guide 2. In the ion desorption process performed by the ion removal apparatus 100, the first current collector 1 collects electricity during the electrical discharge from the first electrode 71. The terminal 15 of the first current collector 1 is connected to an external power source (not illustrated). Examples of a material constituting the first current collector 1 include a graphite sheet, Grafoil, a conductive rubber, and a metal sheet or plate held between or covered with any one or more of the above-described materials. Thus, the first current collector 1 is made of a conductive flexible material.

Figure 2:
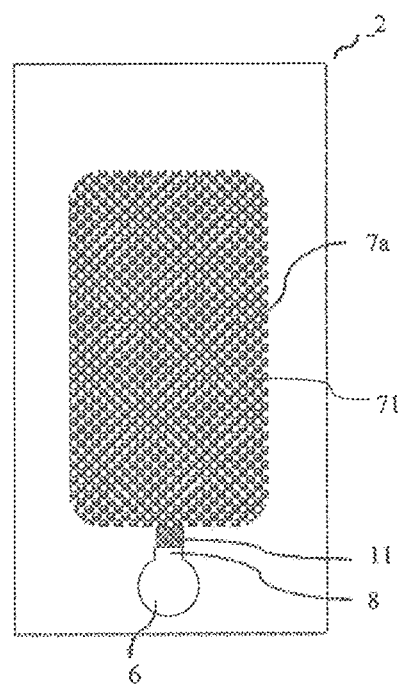
FIG. 2 illustrates the configuration of a first electrode guide 2 according to Embodiment 1.

FIG. 2 illustrates the configuration of the first electrode guide 2 according to Embodiment 1. The first electrode guide 2 has an inlet 6, the first electrode holder 7a, an inflow passage 8, and an outflow prevention part 11. The inlet 6 is an opening serving as a flow passage through which water flows in. The first electrode holder 7a holds the first electrode 71. The inflow passage 8 serves as a flow passage connecting the inlet 6 and the first electrode holder 7a to one another. The outflow prevention part 11 prevents the first electrode 71 disposed in the first electrode holder 7a from flowing out. The outflow prevention part 11 is disposed in the inflow passage 8 or the inlet 6. The outflow prevention part 11 is made of, for example, an insulating resin net, a metal net with an insulating coating, a nonwoven fabric, or a filter paper. Here, the first electrode guide 2 is made of an electrically insulating material having a plate or sheet shape. The first electrode guide 2 is not necessarily a single plate and may be configured by combining plural plates made of different materials. For example, the first electrode guide 2 may be configured by stacking an incompressible plate made of resin or other materials and a compressible plate made of rubber or other materials.

The separator 3 prevents a short circuit from occurring between the first electrode 71 disposed in the first electrode holder 7a of the first electrode guide 2 and the second electrode 72 disposed in the second electrode holder 7b of the second electrode guide 4. Examples of a material constituting the separator 3 include a filter paper, a porous film, a nonwoven fabric, and a foaming agent. Each of the above-described materials is an electrically insulating permeable material not allowing a conductive material to pass therethrough but allowing a liquid to pass therethrough.

Figure 3:
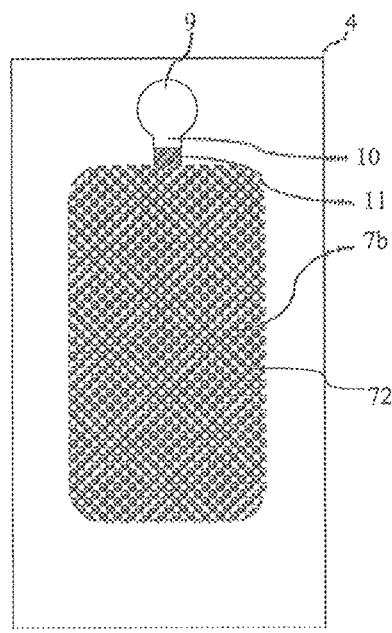
FIG. 3 illustrates the configuration of a second electrode guide 4 according to Embodiment 1.

FIG. 3 illustrates the configuration of the second electrode guide 4 according to Embodiment 1. The second electrode guide 4 includes the second electrode holder 7b, an outlet 9, an outflow passage 10, and an outflow prevention part 11. The second electrode holder 7b holds the second electrode 72. The outlet 9 is an opening serving as a flow passage allowing the water from which ions have been removed to flow out therethrough. The outflow passage 10 serves as a flow passage connecting the outlet 9 and the second electrode holder 7b to one another. The outflow prevention part 11 prevents the second electrode 72 disposed in the second electrode holder 7b from flowing out. The outflow prevention part 11 is disposed in the outflow passage 10 or the outlet 9. As with the outflow prevention part 11, the outflow prevention part 11 is made of, for example, an insulating resin net, a metal net with an insulating coating, a nonwoven fabric, or a filter paper. As with the first electrode guide 2, the second electrode guide 4 is made of an electrically insulating material having a plate or sheet shape. The second electrode guide 4 is not necessarily a single plate and may be configured by combining plural plates made of different materials. For example, the second electrode guide 4 may be configured by stacking an incompressible plate made of resin or other materials and a compressible plate made of rubber or other materials.

The second current collector 5 has an outlet 9 through which the water that has been treated flows out and a terminal 15. In the ion removal process, the second current collector 5 feeds electricity to supply electric charges to the second electrode 72 disposed in the second electrode holder 7b of the second electrode guide 4. In the ion desorption process, the second current collector 5 collects electricity during the electrical discharge from the second electrode 72. The terminal 15 of the second current collector 5 is connected to the external power source (not illustrated). As with the first current collector 1, examples of a material constituting the second current collector 5 include a graphite sheet, Grafoil, a conductive rubber, and a metal sheet or plate held between or covered with any one or more of the above-described materials. Thus, the second current collector 5 is made of a conductive flexible material.

In the ion removal process, the first electrode 71 and the second electrode 72 are supplied with electric charges due to electric power supplied from the power source and adsorb the ions in water. In the ion desorption process, the adsorbed ions are discharged. Here, the first electrode 71 is charged positively or negatively by electric charge supply. On the other hand, the second electrode 72 is charged with a polarity opposite to that of the first electrode 71. The positively charged electrode adsorbs negative ions. The negatively charged electrode adsorbs positive ions. For increasing the capacitance of the capacitor, for example, a conductive material having conductivity and a large specific surface, such as activated carbon, porous carbon, porous conductive beads, or a porous metal, is used for the first electrode 71 and the second electrode 72. The conductive material is in the form of, for example, powder, a particle, or fiber. When the conductive material is in the form of powder or particles, the outside diameter of the conductive material is 100 nm to 10 mm. When the conductive material is in the form of fiber, the thickness of the conductive material is 1 μm to 50 μm. In addition, a fabric or a filter made of any one or more of the conductive materials described above is sometimes used for the first electrode 71 and the second electrode 72.

The first pressing plate 12 has screw holes 14 and an inlet 6. The second pressing plate 13 has screw holes 14 and an outlet 9. Examples of a material used for the first pressing plate 12 and the second pressing plate 13 include a metal plate and a resin plate. Between the first pressing plate 12 and the second pressing plate 13, the first current collector 1, the first electrode guide 2, the separator 3, the second electrode guide 4, and the second current collector 5 are stacked. Screws (not illustrated) are mounted in the screw holes 14 formed in the first pressing plate 12 and the second pressing plate 13. The screws are driven into the screw holes 14, and the first current collector 1, the first electrode guide 2, the separator 3, the second electrode guide 4, and the second current collector 5 are thereby pressed between the first pressing plate 12 and the second pressing plate 13.

At this time, the inlet 6 formed in the first pressing plate 12, the inlet 6 formed in the first current collector 1, and the inlet 6 formed in the first electrode guide 2 are aligned to form the continuous inlets 6. In addition, the outlet 9 formed in the second electrode guide 4, the outlet 9 formed in the second current collector 5, and the outlet 9 formed in the second pressing plate 13 are aligned to form the continuous outlets 9.

The flow passage of the water inside the ion removal apparatus 100 is formed by the first pressing plate 12, the first current collector 1, the first electrode guide 2, the separator 3, the second electrode guide 4, the second current collector 5, and the second pressing plate 13. Next, the flow of the water inside the ion removal apparatus 100 will be described. The water flows in through the inlet 6 of the first pressing plate 12, passes through the inlet 6 of the first current collector 1, and reaches the first electrode guide 2. The water that has reached the first electrode guide 2 further passes through the inflow passage 8 of the first electrode guide 2 and flows into the first electrode holder 7a. The first electrode 71 held by the first electrode holder 7a performs the removal or the desorption of ions. The water that has passed through the first electrode holder 7a passes through the separator 3 having liquid permeability and flows into the second electrode holder 7b of the second electrode guide 4. The second electrode 72 held by the second electrode holder 7b performs the removal or the desorption of ions. The water that has passed through the second electrode holder 7b passes through the outflow passage 10 of the second electrode guide 4 and reaches the outlet 9 of the second electrode guide 4. The water that has reached the outlet 9 of the second electrode guide 4 passes through the outlet 9 of the second current collector and flows out through the outlet 9 of the second pressing plate 13.

As described above, according to the ion removal apparatus 100 of Embodiment 1, such water to be treated passes through, inside the ion removal apparatus 100, the first electrode 71 disposed in the first electrode holder 7a, the separator 3, and the second electrode 72 disposed in the second electrode holder 7b in this order. Thus, with the ion removal apparatus 100, the water passing through inside the apparatus can come into contact with the first electrode 71 and the second electrode 72. Thus, the ion removal performance of the ion removal apparatus 100 can be increased.

Here, although, in the ion removal apparatus 100 of Embodiment 1, the first pressing plate 12 and the second pressing plate 13 are used to press the first current collector 1, the first electrode guide 2, the separator 3, the second electrode guide 4, and the second current collector 5, the pressing method is not limited thereto. For example, the first current collector 1, the first electrode guide 2, the separator 3, the second electrode guide 4, and the second current collector 5 are stacked inside a container having a recessed shape. Subsequently, a lid having a protruding shape is mounted on the container having a recessed shape, and, by a screw, the lid and the container are fastened to one another and pressed. Alternatively, a stack is formed by stacking the first current collector 1, the first electrode guide 2, the separator 3, the second electrode guide 4, and the second current collector 5 and is then pressed by being applied with pressure by a press machine. The pressed stack may be maintained fixed with a band, may be maintained fixed with resin or other materials, or may be fixed at a position inside a box-shaped container. In addition, such a pressed state of the stack may be maintained by a pair of plates or rods disposed on the outer side relative to the first current collector 1 and on the outer side relative to the second current collector 5.

Embodiment 2

Figure 4:
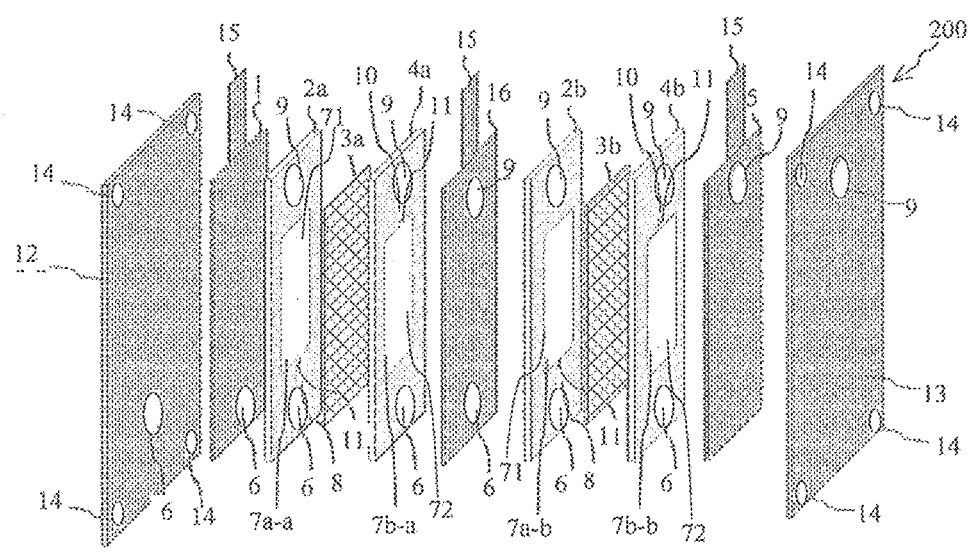
FIG. 4 illustrates the configuration of an ion removal apparatus 200 according to Embodiment 2.

FIG. 4 illustrates the configuration of an ion removal apparatus 200 according to Embodiment 2. In FIG. 4, the parts given the same reference signs as those given in FIG. 1 perform operations similar to those described in Embodiment 1. As FIG. 4 illustrates, the ion removal apparatus 200 according to Embodiment 2 includes two first electrode guides 2a and 2b serving as the first electrode guide 2 of the ion removal apparatus 100 according Embodiment 1. The ion removal apparatus 200 also includes two second electrode guides 4a and 4b serving as the second electrode guide 4 of the ion removal apparatus 100. The ion removal apparatus 200 further includes a third current collector 16. In the ion removal apparatus 200, the first pressing plate 12, the first current collector 1, the first electrode guide 2a, a separator 3a, the second electrode guide 4a, the third current collector 16, the first electrode guide 2b, a separator 3b, the second electrode guide 4b, the second current collector 5, and the second pressing plate 13 are stacked in this order. The stack is pressed by fastening the first pressing plate 12 and the second pressing plate 13 to one another by screws.

As with the first electrode guide 2 of Embodiment 1, the first electrode guides 2a and 2b of Embodiment 2 have inlets 6, first electrode holders 7a (a first electrode holder 7a-a and a first electrode holder 7a-b), inflow passages 8, and outflow prevention parts 11. The first electrode guides 2a and 2b further have outlets 9. Here, the first electrode guide 2a does not contribute to the flow passage formation inside the ion removal apparatus 200, thereby not necessarily having an outlet 9.

As with the second electrode guide 4 of Embodiment 1, the second electrode guides 4a and 4b of Embodiment 2 have second electrode holders 7b (a second electrode holder 7b-a and a second electrode holder 7b-b), outlets 9, outflow passages 10, and outflow prevention parts 11. The second electrode guides 4a and 4b further have inlets 6. Here, the second electrode guide 4b does not contribute to the flow passage formation inside the ion removal apparatus 200, thereby not necessarily having an inlet 6.

The third current collector 16 has an inlet 6, an outlet 9, and a terminal 15. In the ion removal process, the third current collector 16 supplies electric charges to the second electrode 72 disposed in the second electrode holder 7b-a of the second electrode guide 4a and to the first electrode 71 disposed in the first electrode holder 7a-b of the first electrode guide 2b. In the ion desorption process, the third current collector 16 collects electricity during the electrical discharge from the first electrode 71 and the second electrode 72. The terminal 15 of the third current collector 16 is connected to the external power source (not illustrated). As with the first current collector 1 and the second current collector 5, examples of a material constituting the third current collector 16 include a graphite sheet, Grafoil, a conductive rubber, and a metal sheet or plate held between or covered with any one or more of the above-described materials. Thus, the third current collector 16 is made of a conductive flexible material.

In the ion removal apparatus 200, the terminal 15 of the first current collector 1, the terminal 15 of the third current collector 16, and the terminal 15 of the second current collector 5 are connected to the external power source (not illustrated). In the ion removal process of the ion removal apparatus 200, electricity is applied so that the potential difference between the terminal 15 of the first current collector 1 and the terminal 15 of the third current collector 16 is equal to the potential difference between the terminal 15 of the third current collector 16 and the terminal 15 of the second current collector 5.

The flow passage inside the ion removal apparatus 200 is formed by the first pressing plate 12, the first current collector 1, the first electrode guide 2a, the separator 3a, the second electrode guide 4a, the third current collector 16, the first electrode guide 2b, the separator 3b, the second electrode guide 4b, the second current collector 5, and the second pressing plate 13. The first electrode guide 2a, the separator 3a, and the second electrode guide 4a constitute a first-layer electrode unit. In addition, the first electrode guide 2b, the separator 3b, and the second electrode guide 4b constitute a second-layer electrode unit.

Next, the flow of the water inside the ion removal apparatus 200 will be described. The water flows in through the inlet 6 of the first pressing plate 12, passes through the inlet 6 of the first current collector 1, and is then divided into a portion to be treated in the first-layer electrode unit and a portion to be treated in the second-layer electrode unit at the first electrode guide 2a.

The water to be treated in the first-layer unit passes through the inflow passage 8 formed in the first electrode guide 2a and flows into the first electrode holder 7a-a of the first electrode guide 2a. The first electrode 71 held by the first electrode holder 7a-a performs the removal or the desorption of ions. The water that has passed through the first electrode holder 7a-a passes through the separator 3a and flows into the second electrode holder 7b-a of the second electrode guide 4a. The second electrode 72 held by the second electrode holder 7b-a performs the removal or the desorption of ions. The water that has passed through the second electrode holder 7b-a passes through the outflow passage 10 of the second electrode guide 4a and reaches the outlet 9 of the second electrode guide 4a. The water that has reached the outlet 9 of the second electrode guide 4a passes through the outlet 9 of the third current collector 16, the outlet 9 of the first electrode guide 2b, the outlet 9 of the second electrode guide 4b, and the outlet 9 of the second current collector 5 in this order and flows out through the outlet 9 of the second pressing plate 13.

On the other hand, the water to be treated in the second-layer electrode unit passes through the inlet 6 of the second electrode guide 4a and the inlet 6 of the third current collector 16 in this order and reaches the inlet 6 of the first electrode guide 2b. The water that has reached the inlet 6 of the first electrode guide 2b passes through the inflow passage 8 formed in the first electrode guide 2b and flows into the first electrode holder 7a-b of the first electrode guide 2b. The first electrode 71 held by the first electrode holder 7a-b performs the removal or the desorption of ions. The water that has passed through the first electrode holder 7a-b passes through the separator 3b and flows into the second electrode holder 7b-b of the second electrode guide 4b. The second electrode 72 held by the second electrode holder 7b-b performs the removal or the desorption of ions. The water that has passed through the second electrode holder 7b-b passes through the outflow passage 10 of the second electrode guide 4b and reaches the outlet 9 of the second electrode guide 4b. The water that has reached the outlet 9 of the second electrode guide 4b merges with the water that has been treated in the first-layer electrode unit, passes through the outlet 9 of the second current collector 5, and flows out through the outlet 9 of the second pressing plate 13.

As described above, according to the ion removal apparatus 200 of Embodiment 2, the water to be treated passes through, in the first-layer electrode unit, the first electrode 71 disposed in the first electrode holder 7a-a, the separator 3a, and the second electrode 72 disposed in the second electrode holder 7b-a in this order. In the second-layer electrode unit, the water to be treated passes through the first electrode 71 disposed in the first electrode holder 7a-b, the separator 3b, and the second electrode 72 disposed in the second electrode holder 7b-b in this order. Thus, with the ion removal apparatus 200 of Embodiment 2, the water passing through inside the apparatus can come into contact with the first electrode 71 included in the first-layer electrode unit and the second electrode 72 included in the second-layer electrode unit. Consequently, the ion removal performance of the ion removal apparatus 200 can be increased. In addition, the first electrode 71 of the first-layer electrode unit and the first electrode 71 of the second-layer electrode unit in the ion removal apparatus 200 can be supplied with water of the same quality. Such supply of the water with the same quality to the first-layer electrode unit and the second-layer electrode unit enables the two electrode units to achieve the same process performance.

Here, in the ion removal apparatus 200 of Embodiment 2, the potential difference between the terminal 15 of the first current collector 1 and the terminal 15 of the third current collector 16 is made equal to the potential difference between the terminal 15 of the third current collector 16 and the terminal 15 of the second current collector 5. For the purpose, the terminal 15 of the first current collector 1, the terminal 15 of the third current collector 16, and the terminal 15 of the second current collector 5 are connected to the external power source (not illustrated). When the same first electrode 71 and the same second electrode 72 are used in each of the electrode units, the terminal 15 of the first current collector 1 and the terminal 15 of the second current collector 5 are connected to the power source (not illustrated). Electricity in an amount equal to the potential difference in total between the first-layer electrode unit and the second-layer electrode unit may be applied by the power source to the terminal 15 of the first current collector 1 and the terminal 15 of the second current collector 5. With this configuration, the water to be treated in each of the electrode units can have the same quality, and the electrical resistances of the electrode units can be equalized. When the terminals 15 of the current collectors on the outermost sides (the terminal 15 of the first current collector 1 and the terminal 15 of the second current collector 5 in the ion removal apparatus 200 of Embodiment 2 illustrated in FIG. 4) are connected to the power source and fed with electricity for electric charge supply, electricity can be distributed so that the electric potentials of the electrode units are equalized. In such a case, there is no need for a current collector other than the current collectors on the outermost sides to have a terminal 15. In addition, electric current supply rather than voltage application may be performed by the power source in the ion removal process. When electric current is supplied, after a certain voltage is achieved, a control for applying a constant voltage may be performed.

Embodiment 3

Although the ion removal apparatus 200 of Embodiment 2 including two electrode units is described, an apparatus may be configured by three or more electrode units. For example, when electrode units of n layers are stacked, [the first current collector 1], [the first electrode guide 2/the separator 3/the second electrode guide 4/the third current collector 16], . . . , (n−1) [the first electrode guide 2/the separator 3/the second electrode guide 4] [the second current collector 5] are stacked. When the first electrode guides 2 and the second electrode guides 4 are provided in plural layers, the first electrode guide 2 adjacent to the first current collector 1 does not necessarily have an outlet 9. In addition, the second electrode guide 4 adjacent to the second current collector 5 does not necessarily have an inlet 6.

REFERENCE SIGNS LIST

1: first current collector, 2, 2a, 2b: first electrode guide, 3, 3a, 3b: separator, 4, 4a, 4b: second electrode guide, 5: second current collector, 6: inlet, 7a, 7a-a, 7a-b: first electrode holder, 7b, 7b-a, 7b-b: second electrode holder, 8: inflow passage, 9: outlet, 10: outflow passage, 11: outflow prevention part, 12: first pressing plate, 13: second pressing plate, 14: screw hole, 15: terminal, 16: third current collector, 100, 200: ion removal apparatus

The invention claimed is:

1. An ion removal apparatus for performing a desalination treatment on a liquid, the ion removal apparatus comprising:
  a first electrode including a conductive material that adsorbs an ion in the liquid;
  a first electrode guide having an electric insulation property, the first electrode guide including:
    an inlet allowing the liquid to flow in,
    a first electrode holder holding the first electrode, and
    an inflow passage serving as a flow passage connecting the inlet and the first electrode holder to one another;
  a first current collector that has an inlet allowing the liquid to flow in, and is in contact with the first electrode guide and supplies an electric charge to the first electrode;
  a second electrode that adsorbs the ion in the liquid;
  a second electrode guide including:
    an outlet allowing the liquid to flow out,
    a second electrode holder receiving and holding the second electrode and allowing the liquid passing through the first electrode holder to flow in, and
    an outflow passage serving as a flow passage connecting the outlet and the second electrode holder to one another;
  a second current collector that has an outlet allowing the liquid to flow out, and is in contact with the second electrode guide and supplies an electric charge to the second electrode; and
  a separator disposed between the first electrode guide and the second electrode guide to separate the first electrode and the second electrode from one another,
  wherein
  the inlet of the first electrode guide is on a part of the first electrode guide, the part being separate from the first electrode,
  the inlet of the first electrode guide and the inlet of the first current collector face each other,
  the outlet of the second electrode guide is on a part of the second electrode guide, the part being separate from the second electrode,
  the outlet of the second electrode guide and the outlet of the second current collector face each other,
  the first current collector and the second current collector are disposed to sandwich the first electrode guide and the second electrode guide,
  the liquid passes through the inlet of the first current collector, the inlet of the first electrode guide, the inflow passage, the first electrode holder, the separator, the second electrode holder, the outflow passage, the outlet of the second electrode guide, and the outlet of the second current collector, in order.

2. The ion removal apparatus of claim 1, wherein:
at least one of the first electrode guide and the second electrode guide includes an outflow prevention part that prevents the first electrode from flowing out of the first electrode holder or the second electrode from flowing out of the second electrode holder.

3. The ion removal apparatus of claim 2, wherein:
at least one of the first electrode and the second electrode is made of a conductive material in a form of powder, a particle, or fiber.

4. The ion removal apparatus of claim 1, wherein:
at least one of the first electrode and the second electrode is made of a conductive material in a form of powder, a particle, or fiber.

5. The ion removal apparatus of claim 1, wherein:
the ion removal apparatus comprises a plurality of stacks, each of the stacks including a combination of the first electrode guide and the second electrode guide,
the first current collector is in contact with and supplies the electric charge to the first electrode guide of an outermost one of the stacks,
the second current collector is in contact with and supplies the electric charge to the second electrode guide of an outermost one of the stacks, and
the ion removal apparatus further comprises a third current collector that is disposed between the first electrode guide and the second electrode guide of adjacent ones of the stacks and supplies the electric charge.

6. The ion removal apparatus of claim 5, wherein:
at least one of the first electrode guide and the second electrode guide includes an outflow prevention part that prevents the first electrode from flowing out of the first electrode holder or the second electrode from flowing out of the second electrode holder.

7. The ion removal apparatus of claim 6, wherein:
at least one of the first electrode and the second electrode is made of a conductive material in a form of powder, a particle, or fiber.

8. The ion removal apparatus of claim 5, wherein:
at least one of the first electrode and the second electrode is made of a conductive material in a form of powder, a particle, or fiber.

* * * * *